(12) United States Patent
Riepe et al.

(10) Patent No.: US 12,033,129 B1
(45) Date of Patent: *Jul. 9, 2024

(54) SYSTEM AND METHOD FOR ASSISTING INDIVIDUALS IN ASSESSING AND IMPROVING THEIR BEHAVIOR REGARDING FINANCIAL AND OTHER-THAN-FINANCIAL PLANNING BASED ON THEIR PERSONAL CIRCUMSTANCES AND ASSISTING WITH IMPLEMENTING SUCH PLANS

(71) Applicant: Charles Schwab & Co., Inc., Westlake, TX (US)

(72) Inventors: Mark Riepe, Moraga, CA (US); Mark Jamison, Mill Valley, CA (US)

(73) Assignee: CHARLES SCHWAB & CO., INC., San Franciso, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/813,525

(22) Filed: Jul. 19, 2022

Related U.S. Application Data

(63) Continuation of application No. 12/313,191, filed on Nov. 17, 2008, now Pat. No. 11,392,918.

(51) Int. Cl.
*G06Q 20/20* (2012.01)
*G06Q 20/22* (2012.01)

(52) U.S. Cl.
CPC ........... *G06Q 20/227* (2013.01); *G06Q 20/22* (2013.01)

(58) Field of Classification Search
CPC .................................................. G06Q 20/227

USPC ........................................................ 705/36 R
See application file for complete search history.

(56) References Cited

U.S. PATENT DOCUMENTS

| | | | |
|---|---|---|---|
| 4,671,772 A | 6/1987 | Slade et al. | |
| 5,437,553 A | 8/1995 | Collins et al. | |
| 5,551,880 A | 9/1996 | Bonnstetter et al. | |
| 6,093,026 A | 7/2000 | Walker et al. | |
| 6,260,033 B1 | 7/2001 | Tatsuoka | |
| 7,440,919 B2 | 10/2008 | Odegaard et al. | |
| 7,698,190 B2 | 4/2010 | Penkalski et al. | |
| 7,702,531 B2 | 4/2010 | Draper et al. | |
| 2002/0019791 A1* | 2/2002 | Goss ...................... | G06Q 40/06 705/36 R |
| 2002/0045154 A1* | 4/2002 | Wood ..................... | G09B 23/28 434/350 |
| 2002/0073005 A1* | 6/2002 | Welnicki ................ | G06Q 40/06 705/36 R |
| 2006/0242004 A1 | 10/2006 | Yaskin et al. | |
| 2007/0038536 A1* | 2/2007 | Wise ...................... | G06Q 40/02 705/35 |
| 2007/0072156 A1* | 3/2007 | Kaufman ............... | G16H 20/60 434/236 |
| 2007/0094595 A1 | 4/2007 | Heck et al. | |
| 2007/0112668 A1 | 5/2007 | Celano et al. | |

(Continued)

OTHER PUBLICATIONS

STIC EIC Search Report, dated Aug. 27, 2021. (Year: 2021).

(Continued)

*Primary Examiner* — Hai Tran
(74) *Attorney, Agent, or Firm* — Harness, Dickey & Pierce, P.L.C.

(57) ABSTRACT

A system and method identifies a score for a user using the user's response to questions from a number of different financial and other-than-financial planning dimensions.

16 Claims, 5 Drawing Sheets

(56) References Cited

U.S. PATENT DOCUMENTS

| | | |
|---|---|---|
| 2007/0288399 A1 | 12/2007 | Reynolds |
| 2008/0288209 A1* | 11/2008 | Hunt .................... G06Q 30/02 |
| | | 702/179 |
| 2009/0106136 A1 | 4/2009 | Wright |
| 2009/0271208 A1 | 10/2009 | Hickey et al. |
| 2011/0153482 A1* | 6/2011 | Conigliaro ............ G06Q 40/00 |
| | | 705/35 |

OTHER PUBLICATIONS

"Financial Planning" Banking and Finance Terminology, 4th Edition, American Bankers Association, DC, 1999, p. 166.

"Financial Planning" A dictionary of Finance and Banking, Eds. Brian Butler, et al. Market House Books, 1997, p. 137.

"Ameriprise webpage on Financial planning" Dated Apr. 18, 2009.

Mathison, Sandra, Ed., Encyclopedia of Evaluation, Sage Publications, Thousand Oaks, 2005.

Fano, Andrew, "A strategy-Based theory of Planning for Goal-Based Scenario Learning Environments," Dissertation, Northwestern University, Dec. 1996.

\* cited by examiner

SYSTEM AND METHOD FOR ASSISTING INDIVIDUALS IN ASSESSING AND IMPROVING THEIR BEHAVIOR REGARDING FINANCIAL AND OTHER-THAN-FINANCIAL PLANNING BASED ON THEIR PERSONAL CIRCUMSTANCES AND ASSISTING WITH IMPLEMENTING SUCH PLANS

CROSS REFERENCE TO RELATED APPLICATIONS

This application is a continuation of U.S. patent application Ser. No. 12/313,191, entitled "System and Method for Assisting Individuals In Assessing and Improving Their Behavior Regarding Financial and Other-Than-Financial Planning Based On Their Personal Circumstances and Assisting With Implementing such Plans" filed on Nov. 17, 2008 by Mark Jamison and Mark Riepe, having the same assignee as the present application, and is hereby incorporated by reference in its entirety.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

INVENTORS

Mark Riepe
Mark Jamison

FIELD OF THE INVENTION

The present invention is related to computer software and more specifically to computer software for financial planning.

BACKGROUND OF THE INVENTION

Many individuals should evaluate the suitability of their financial and other-than-financial planning for their current and future personal circumstances, but they do not do so, or they may perform appropriate financial and other than financial planning, but they may not carry out these plans. "Other-than-financial" may include items that, though related to the user's finances, may have a primary purpose that does not. For example, insurance planning costs the user money, but also involves planning for finances of the user's heirs after the end of the user's life, and thus represents "other-than-financial" planning.

What is needed is a system and method for assisting an individual in evaluating the suitability of their financial and other-than-financial planning for their current and future personal circumstances, and in implementing such plans.

SUMMARY OF INVENTION

A system and method displays questions from each of multiple dimensions relating to the suitability of financial and other-than-financial types of planning that have been performed by the user, identifies one or more scores from the users responses to the questions involving the various dimensions, and provides one or more corresponding comparison scores from that same user or multiple different users to allow the system and method to indicate the user's suitability of financial and other-than-financial planning. The one or more scores and one or more comparison scores may include one score for each dimension, an overall score, or each of these. Resources available for the user to use to improve his score (and therefore, the suitability of their financial and other-than-financial planning) may be provided based on any or all of the one or more responses or scores, and optionally the one or more comparison scores. A set of action items may also be identified based on any or all of the user's responses, scores, and optionally the comparison scores. The user may be prompted, for example, via an e-mail message, to review their "to do" list and to check off action items completed, and such reminder may be based on the user's one or more responses from which the one or more scores were computed.

DETAILED DESCRIPTION OF A PREFERRED EMBODIMENT

Figure 1A:
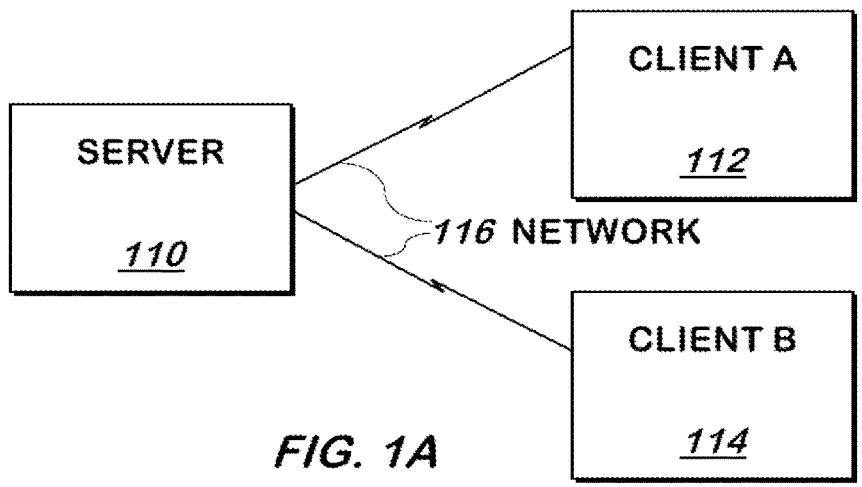
FIG. 1A is a block schematic diagram of a conventional computer network.
Figure 1B:
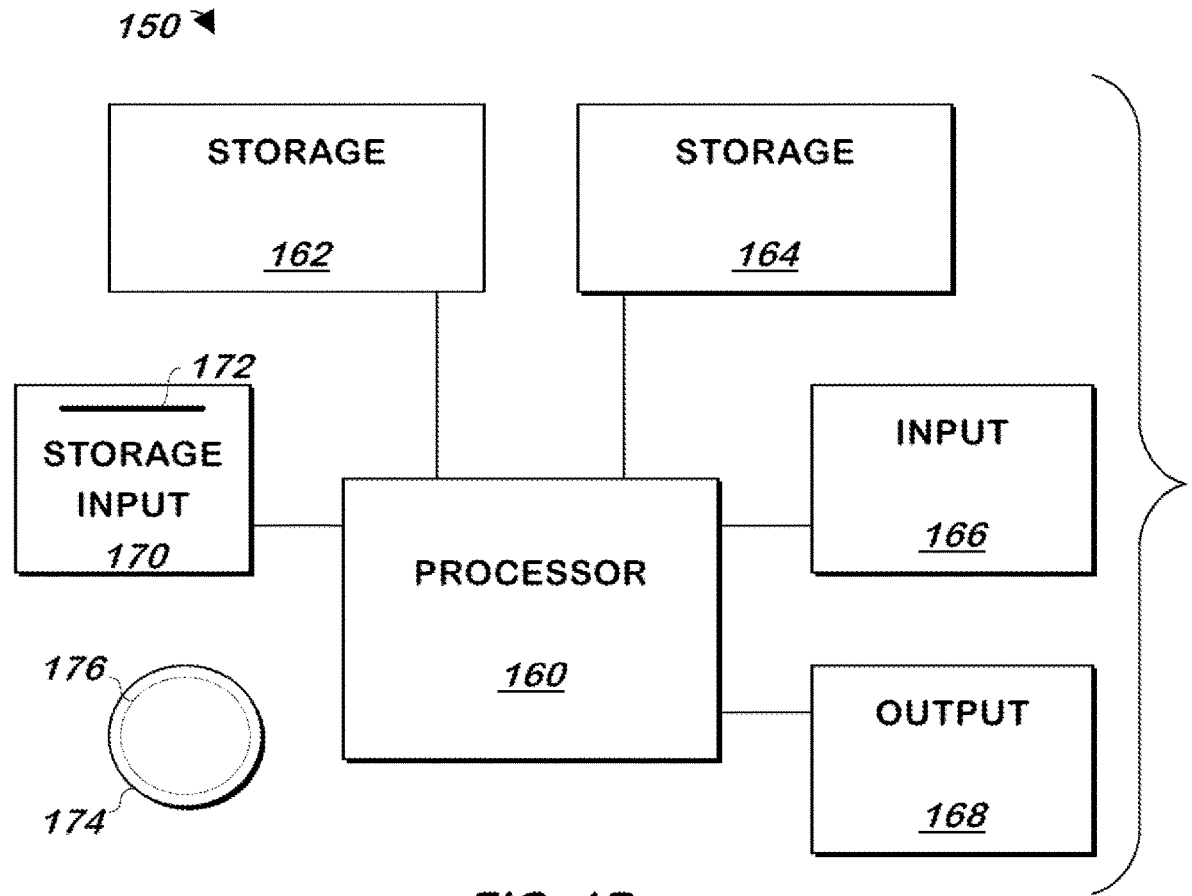
FIG. 1B is a block schematic diagram of a conventional computer system.

The present invention may be implemented across a computer network. Referring now to FIG. 1A, a conventional computer network is shown according to one embodiment of the present invention. Server 110 is coupled to clients 112, 114 via a computer network 116 such as the Internet. The server 110 and clients 112, 114 each have conventional communications hardware such as a TCP/IP compatible communications interface, such as a conventional Ethernet interface running suitable communications protocols.

The present invention may be implemented as computer software on a conventional computer system. Referring now to FIG. 13, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, California, a PENTIUM-compatible personal computer system such as are available from DELL COMPUTER CORPORATION of Round Rock, Texas running a version of the WINDOWS operating system (such as 95, 98, Me, XP, NT or 2000) commercially available from MICROSOFT Corporation of Redmond Washington or a Macintosh computer system running the MACOS or OPENSTEP operating system commercially available from APPLE INCORPORATED of Cupertino, California and the FIREFOX browser commercially available from MOZILLA FOUNDATION of Mountain View, California or INTERNET EXPLORER browser commercially available from MICROSOFT above, although other systems may be used.

Figures 2, 2A:
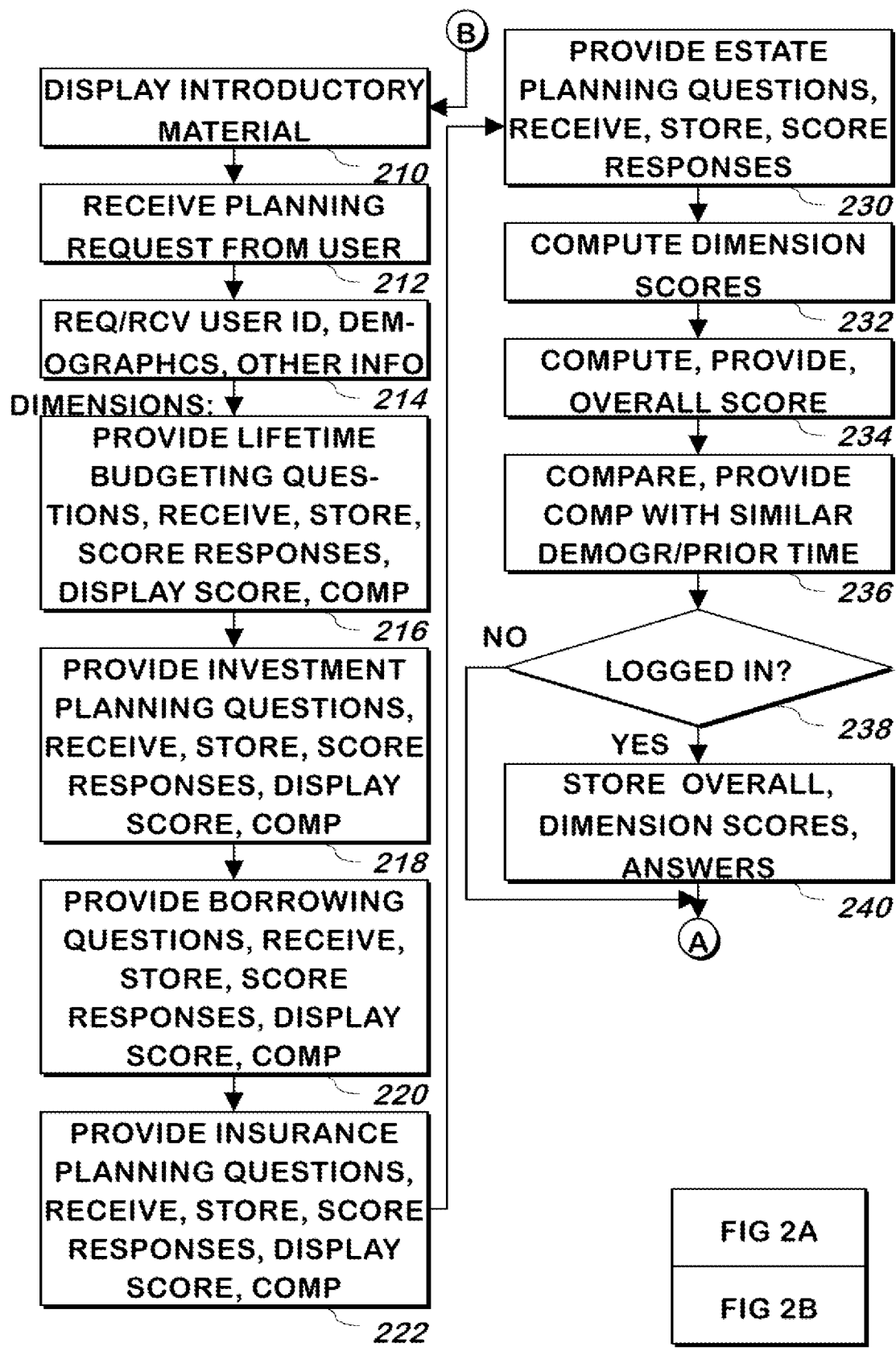
FIG. 2, consisting of FIG. 2A and FIG. 2B, is a flowchart illustrating a method of assisting an individual with evaluating the suitability of his or her financial and other-than-financial planning and in carrying out a plan according to one embodiment of the present invention.
Figure 2B:
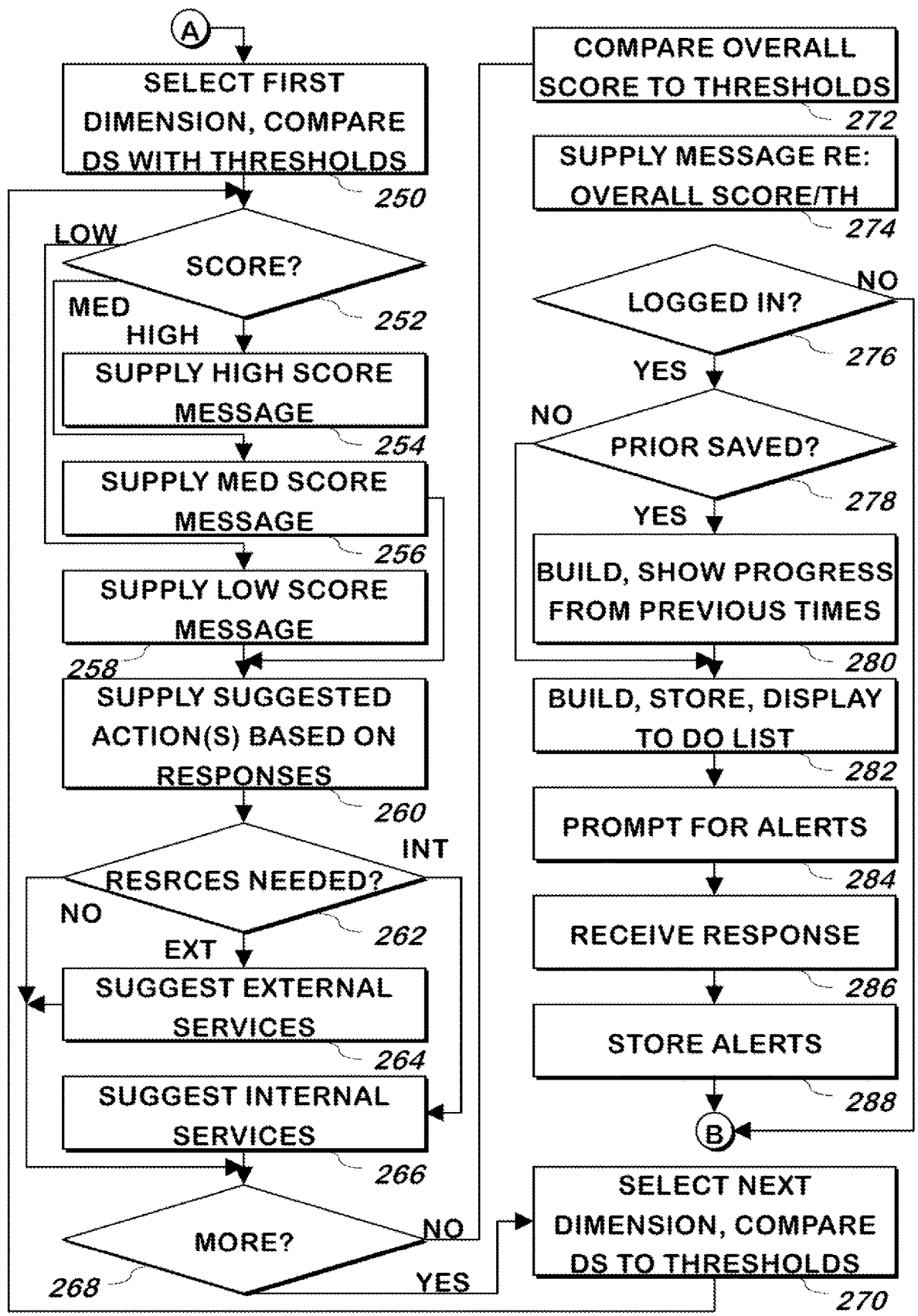

FIGS. 2A and 2B are a flowchart illustrating a method of assisting an individual in evaluating the suitability of the individual's financial and other-than-financial planning and in carrying out a financial and other-than-financial plan according to one embodiment of the present invention.

Referring now to FIG. 2A, introductory material is provided 210 for display to a user, for example as part of a conventional web page. The introductory material may include an explanation of the financial and other-than-financial planning suitability tools and coaching tools described herein and an invitation to try these financial and other-than-financial planning suitability tools and coaching tools.

A request to start an analysis of the suitability of an individual's financial and other-than-financial plans is received 212 from a user. The request may be initiated by the user clicking a link on the web page displaying the introductory material, in one embodiment.

In response to the request, the user is requested to provide some or all of a user identifier, demographic information about the user for which the financial and other-than-financial planning assistance is being requested (e.g. age, annual earnings, employment status, e.g. "are you working: no, yes-full time, yes-part time?" as well as other personal information, and such information is received 214. In one embodiment, the user identifier is an account identifier at a financial institution, or it may be another identifier such as an e-mail address or it may be both of these. In one embodiment, providing the user identifier is optional: additional capabilities are provided if it is received as described in more detail below.

In one embodiment, if a user provides an account identifier, the information generated as described below may be saved and reviewed at a later time as described below, and if the user does not provide an account identifier, the information generated as described below will not be saved. In still another embodiment, if an account identifier is not provided as a user identifier, the user may select a password to use and the information generated as described below may be saved for use as described below. If the information described below is not saved, some or all of the follow on interaction (e.g. that which occurs subsequent to the initial session) described below may not be provided if the user repeats the method at a later time. In one embodiment, if an account identifier is received, the password for the account identifier is also requested and received to authenticate the user. In one embodiment, if the user has already provided their account identifier and password, and such password is used to authenticate the user in a conventional fashion, they need not provide it again, and the information generated as described below will be saved without the user providing their account identifier and password at step 214 because the previously provided and authenticated account identifier will be retrieved at step 214 and used as if the user had provided it at step 214.

The user is provided with questions, and the user's responses are received and stored in steps 216-230. Each of the questions corresponds to one or more "dimensions" (i.e., aspects) of a plan involving the user's finances and other-than-financial elements. In one embodiment, one or more of the questions relate to that user's behavior with respect to financial planning and other-than-financial planning. In one embodiment, the dimensions include one or more of the following: lifetime budgeting, investing, borrowing, insuring and estate planning, but other dimensions may also be used. An example of the specific questions for each dimension is shown in Appendix A, though other questions may be used.

In one embodiment, the lifetime budgeting dimension relates to planning to have adequate cash available throughout one's lifetime. In one embodiment, the investing dimension relates to planning one's investments in accordance with one's investment goals and risk tolerance. In one embodiment, the borrowing dimension relates to analysis of one's debts and maintaining debt at a manageable level based on one's income and assets. In one embodiment, the insuring dimension relates to sufficiency of insurance based on one's current circumstances. In one embodiment, the estate planning dimension relates to sufficiency of planning for one's affairs in case of death or incapacitation. Although some of the questions of steps 216-230 may overlap from one dimension to the next, in one embodiment, every such question will relate to fewer than all of the dimensions.

The questions in Appendix A and as stated in steps 216-230 are organized so that questions of a single dimension are provided together, though questions of multiple dimensions may be mixed together and questions of the same dimension may be separated from one another by questions of other dimensions in some embodiments.

In one embodiment, the questions may be provided as a function of the demographic information received in step 214. For example, rather than asking whether the user spends more than a certain percentage of their income on housing, which would require the user to perform calculations, the question computes that percentage (optionally rounding to the nearest $1) and asks if the user spends that amount on housing.

In one embodiment, some, most or all of the questions are presented in a manner that would not require any research by all but a very few users. For example, rather than asking how much life insurance the user has, the user may be asked whether the amount of life insurance is adequate for their circumstances at the time, or whether they have reviewed the adequacy of their life insurance with someone knowledgeable in the past year. In another example, the demographic information requested may have been the ages of the user's children, and if the youngest child is over 25, the demographic information may also request when that youngest child graduated college, and this information may be used to pose one of the questions in steps 216-230, such as identifying the age of the youngest child and asking whether the user has reviewed the adequacy of their life insurance policy in the same number of years as the youngest child's age, if the youngest child is less than 25, or since the youngest child graduated college if the youngest child is over 25.

As part of some or all of the steps 216-230, the responses are each scored and used to build some or all of a dimension score for some or all of each of the dimensions and a total score for all dimensions, either as the questions are being answered or after the last question is answered as described below. In one embodiment, some or all of such dimension scores are computed and displayed when all of the questions for a dimension have been answered. Any score may be numerically displayed or may be displayed in graphical form, for example, as a bar chart, with each bar corresponding to a different dimension. The display of the scores may be updated when all of the questions for a dimension have been answered or upon receipt of the responses for each question.

The scores for each response may affect a single dimension or more than one dimension. For example, if a question relates to two or more dimensions, the score may affect the dimension score most closely related to the question, or it may affect all of the dimension scores corresponding to the dimensions to which the question is related. In one embodiment, each dimension will have a question related to it, but that question will not be related to all of the dimensions corresponding to the other questions.

If not already performed as described above, the scores for each dimension are computed 232. In one embodiment, to compute a dimension score either at this point or above, the responses (also referred to as "answers") for each question have scores associated with each possible response, and each question is associated with a dimension (one or more questions may be associated with each dimension). The score for a dimension is the sum of the scores for each response for that dimension. Other ways of computing dimension scores include assigning a weight to a question and then multiplying the score for the answer by the question weight for each question associated with a dimension and then summing such products for each dimension to identify the dimension score. Step 232 may or may not include providing for display to the user the dimension score for each dimension.

If not already performed as described above, an overall score is identified for, and provided to, the user 234. The overall score for the user is computed using all of the responses from all of the different dimensions, for example, by summing the dimension scores or by multiplying each dimension score by a weight and summing these products.

In one embodiment, at least one comparison score is also displayed 236. In one embodiment, the user may turn on or off the display of comparison scores. A comparison score is a score that may be displayed to the user for the purpose of comparison with any or all of the dimension scores and the overall score, and may be referred to as a "comparison score".

The comparison score or scores may have any of several sources. For example, the at least one comparison score may be the dimension score or overall score for that same user at a prior time the user answered the questions or similar questions. Such prior time may be the most recent time the user answered the questions or similar questions. The comparison score or scores may be an average of multiple times the same user answered questions from the same dimensions or an average of the overall scores or both. The average may be weighted, for example, in favor of more recent scores.

The source of the one or more comparison scores may be other individuals. In one embodiment, at least one comparison score may be the average (across multiple other users) total score or average (across multiple other users) dimension for such other users computed in the same manner as described herein, based upon responses such other users provided. The other users may have answered the same or similar questions, either as a result of participating for their own financial and/or other-than-financial planning suitability and planning assistance purposes or as a result of a survey performed for the purpose of identifying one or more comparison scores by, or for, the party who provides the questions. The calculation of such at least one comparison score may be limited to such other users who have the same or similar demographic information as the demographic information received in step 214 as the user currently answering the questions. Such comparison score or scores allows the user answering the question to gage the dimension or overall scores against other users of similar or identical demographics as such user to identify whether the user is ahead of their peers or behind their peers as related to the suitability of that individual user's financial and other-than-financial planning. In one embodiment, the user may select the source of the comparison score or scores.

Step 236 may include comparing any or all of the dimension scores and the overall score with a comparison dimension score or comparison overall score made up of the average overall score from the user or other users as described above, if not already performed as described above. As noted, the overall score and the overall comparison score will contain elements of each of the dimensions listed above. The comparison may include a message regarding how the user's level of suitability of financial and other-than-financial planning compares with that of other users or others studied who have demographic information similar or identical to the user or with the same user at an earlier time.

If the user is logged in using a user identifier or has otherwise indicated a desire to store the scores (e.g., by providing an e-mail address) 238, some or all of the overall score, the dimension scores and the individual responses are stored 240 associated with an identifier of the user (e.g., the user identifier or the e-mail address or both), and the method continues at step 250 of FIG. 2B. Otherwise 238, some or all of such information will not be stored and the method continues at step 250 of FIG. 2B.

Referring now to FIG. 2B, at step 250, a first dimension is selected and the dimension score for the selected dimension is compared to two thresholds. Although two thresholds are used in one embodiment, other embodiments may use other numbers of thresholds. For example, in one embodiment, a single threshold may be used to identify that the user is either on track or not. In one embodiment, two thresholds define the border of three regions: high, medium and low. The thresholds may be set as a function of the dimension scores of the other users or other users having the same or similar demographics as the user corresponding to the responses received as described above, for example, setting the thresholds at the upper and lower 25' percentile of the responses of such other users or, in the case of a single threshold, at the mean or median score of other users or other users of the same or similar demographics as the current user.

Various messages may be provided for each dimension that indicate the user's score indicating suitability of financial and other-than-financial planning relative to a prior time that same user responded to the questions or other users having similar demographic information to that provided above, or both. It is noted that other elements of the plan itself need not be analyzed, the emphasis is on the suitability of the level of financial and other-than-financial planning, not the plan itself.

If the dimension score for the selected dimension is above the higher threshold, indicating the score is in the high region 252, a first message for the dimension is provided. The first message may include describing that the user's score indicating suitability of financial and/or other-than-financial planning for the selected dimension is higher than that of their peers, directions to the user to keep coming back periodically and checking their suitability of financial and other-than-financial planning, how to maintain the high score with respect to that dimension, a description of how the other users described above scored, why the score was higher than average or $25^{th}$ percentile of such other users, and other similar information.

A second message is provided for display 256 if the score for the selected dimension is between the thresholds, indicating the score is in the medium region 252. The second message may also compare the dimension score with one or more average scores of other users or scores of one or more percentiles of users (e.g. those used to compute the thresholds) as described above, may indicate the user's score indicating suitability of financial and/or other-than-financial planning for the selected dimension is similar to that of the user's peers (e.g., those with similar demographic information as was provided by the user) and may describe how the user's score for that dimension can be improved. The user's actual responses to each of the questions may be used to tailor the second message, for example, highlighting areas of weakness and noting areas of strength as indicated by the user's responses as compared with the other user's responses.

If the score for the selected dimension is below the lower threshold, indicating the score is in the low region 252, a third message is provided to the user for display 258. The third message may indicate that the user's score indicating suitability of financial and/or other-than-financial planning for the selected dimension is below those of the other user's or the percentile of the other users used to set the lower threshold and indicate that the user is recommended to take action of the type described below and return to answer the questions again. Parts of the third message may be similar or identical to the second message, for example indicating any areas of strength or weakness as exhibited by the responses as compared with those of a hypothetical user.

In one embodiment, each message displayed as described above is displayed using a color that corresponds to an average score for each of the user's responses that correspond to the selected dimension. In one embodiment, each response is associated with a score in the range of 0-3, with the response having a score of '0' being furthest from the ideal, and a response having a score of '3' being closest to the ideal. If the average score for the selected dimension is in the range of 0-1, the message for that dimension is displayed in red. If the average score for the selected dimension is above 1 but not higher than 2, the message for the selected dimension is displayed in yellow. If the average score for the selected dimension is above 2 and up to 3, the message for the selected dimension is displayed in green. Other ranges, colors, and/or color assignments may be used in other embodiments. In one embodiment, messages described below may also be provided in the same or similar fashion.

A message containing suggested actions may be provided for display 260 based on the user's responses, and optionally, those of the other users or other users of the same or similar demographics as the current user. Suggested actions may include forming a written retirement plan, making a will if the user indicated that the user doesn't have one, updating it if the user indicated that it was last made many years ago or before the user indicated that an event had occurred subsequently to his most recent will that would indicate that it requires updating (e.g., a divorce), evaluating his insurance coverage, and the like.

In one embodiment, step 260 may include identifying resources that the user can draw on to perform the actions suggested. In one embodiment, resources include internal resources, those that can be supplied by the party (or a closely affiliated party) performing some or all of the method of FIGS. 2A and 2B for the user, and external resources, those that can be supplied by parties unaffiliated or loosely affiliated with the party performing some or all of the method of FIGS. 2A and 2B. Resources may include lists of people to call, e-mail addresses, information or links to information, and the like.

If one or more internal resources are available to help perform the actions suggested or otherwise assist the user in improving or maintaining his or her score for the selected dimension 262, such one or more internal resources are provided for display 266 to the user. If one or more external resources are available to help perform the actions suggested or otherwise assist the user in improving or maintaining his or her score for the selected dimension 262, such one or more external resources are provided for display 264 to the user. It is noted that both type of resources may be available and may be provided. The resources provided may be a function of the score (e.g., beginner-type resources provided for users with lower dimension scores), the responses (or scores for those responses) to specific questions (e.g., the resources may be tailored to responses indicating weakness in certain areas), or all of these. Following steps 264 and/or 266, the method continues at step 268. If no resources are available for the selected dimension 262, the method continues at step 268. In one embodiment, resources are provided for display for each of at least some of the dimensions, or all of the dimensions.

At step 268, if there are more dimensions, the next dimension is selected and the dimension score is compared to the one or more thresholds for the selected dimension (or the same thresholds may be used for all dimensions) 270 and the method continues at step 252 using the newly selected dimension.

If there are no more dimensions 268, the user's overall score is compared 272 with one or more thresholds each based on the user's prior score, the scores of other individuals who responded to the same or similar dimension questions, or both, and one or more messages are displayed to the user 274 based on the overall score relative to the one or more thresholds, in the manner similar to that described above and herein.

If the user is logged in or has otherwise provided a user identifier 276, and the user has information saved from a prior session in which the user answered the same or similar questions 278, a description or chart or other information is generated that shows how the user has made progress from any previous times the same user provided responses to a similar or the same questions 280. As opposed to the comparison of scores described above, this information only identifies how the user got better, stayed the same or got worse from any prior time the user provided such responses, though it may also compare scores to prior scores, either of responses to similar questions, dimensions or overall. The focus here may be on any progress that was made or steps backward that were taken from one or more prior times by the same user, as opposed to differences in scores of other users. The method continues at step 282. If the user has no prior saved information 278, the method continues at step 282.

At step 282, a "to do" list is generated, stored associated with the user identifier or e-mail address, and provided for display and/or printing. The "to do" list may include any or all of things the user can do between the current time and the next time the user may answer the same questions or similar questions, that will enable the user to maintain or improve their scores to each of the dimensions and/or questions. The "to do" list may be similar to, or address some or all of the same issues as, the suggested actions described above, but may be in the form of a more terse list. The "to do" list may be interactive, allowing the user to check off items the user has completed, as described in more detail below. In addition, a link to the "to do" list may be e-mailed to the user to allow the user to review the list and to check items off the list at a future time.

The user may be prompted 284 to set up alerts or other reminders, such as e-mail messages that can automatically be sent to the user at a future time or times to remind the user to check their "to do" list and update it, for example, by performing items on the "to do" list and checking performed items off the "to do" list. The responses to such prompts are received 286 and any responses are stored 288, so that they may be processed as described with respect to FIG. 3. Step 288 may include scheduling a date of the alert and identifying a schedule for the alert to repeat. The date and/or schedule may be made in response to the user's answers to the questions, or number or type of "to do" list items not checked off. The method continues at step 210, for example for a different user or at a later time for the same user and may be repeated many times by each user. If, at step 276, the user is not logged in, the method continues at step 210 for the same user at a later time or for a different user.

In one embodiment, the questions, scores, possible responses, suggestions, resources or action items on the "to do" list in a future iteration of the method of FIGS. 2A and 2B may be changed based on prior responses the user has provided, or action items that are or are not checked off the user's earlier "to do" list. For example, the questions may become more tailored to the user's circumstances, or an action item that has been put off and not completed for many iterations may appear higher up in the list.

Figure 3:
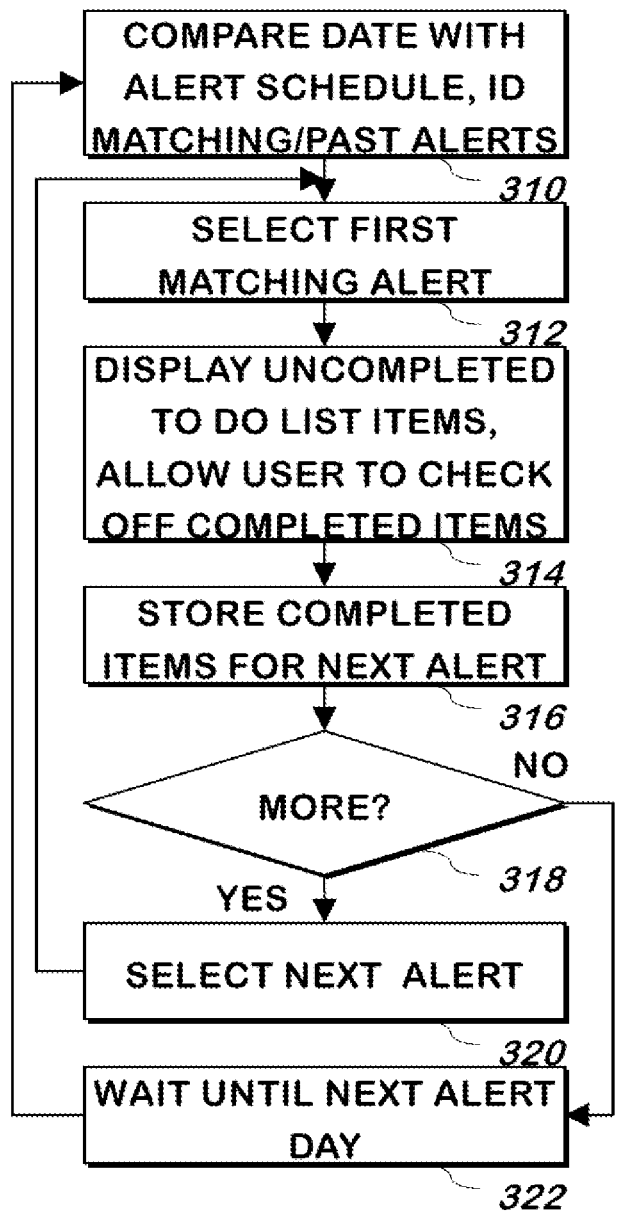
FIG. 3 is a flowchart illustrating a method of reminding users to review and update a financial and other-than-financial planning to do list according to one embodiment of the present invention.

Referring now to FIG. 3, a method of sending alerts is shown according to one embodiment of the present invention. The current date is compared with the dates that each of the stored alerts should be delivered 310. The first alert that should be delivered as of the current date (e.g., because it is scheduled on or near the current date) is selected 312 and a link to a "to do" list or access to the "to do" list itself is sent 314, for example, in an e-mail message or text message, to a user corresponding to the alert. In one embodiment, the link or "to do" list reminds the user of things the user is to do to maintain or enhance their financial and other-than-financial planning, and allows the user to check off things they have already done.

Any checked off items are received and stored 316 for the next alert to be sent or the next financial and other-than-financial suitability planning of FIGS. 2A and 2B. Step 316 may include scheduling the next alert if the alerts are to be sent according to a repeating period of time and may be in response to the number or type of unchecked off "to do" list items, with more numerous unchecked-off items or more urgent items causing more frequent reminders.

If there are more alerts matching or corresponding to the current date 318, the next matching or corresponding alert is selected 320 and the method continues at step 314 using the newly selected alert. Otherwise 318, the method waits 322 until the next day alerts are to be sent, such as the next non-holiday weekday, and the method continues at step 310.

In one embodiment, a client/server arrangement of two computer systems may be used to receive information from, and provide information to, the user as described herein. The server computer system generates HTML code and provides it to the second computer system over a computer network, such as the Internet. The client computer system renders the HTML code into a graphical display in the form of a web page, renders the graphics using conventional methods, and provides the rendered graphics to the user's computer display. The client computer system receives user input, provides it to the server, and the server performs the processing as described herein. In another embodiment, the server computer system provides a program, such as a conventional flash program, to the client computer system, and the program performs the functions described herein on the client computer system, including receiving and processing the input and providing the output. In one such embodiment, the client computer system provides data for storage over the network to the server computer system.

In one embodiment, one or more data structures are used to store, at least briefly, all data received, processed and provided as described herein. When the data structure is changed, it is physically transformed. The dimension scores and the overall score are computed and stored in a data structure in a tangible computer medium, such as memory or disk storage, thereby transforming the data structure. For example, to provide a message, the message is added to the data structure that includes messages for the user and then provided to the user. In one embodiment, each such data structure is stored on one or more tangible computer readable media, such as a disk or memory. The data structure may be a single physical entity or multiple physical entities, logically related to one another.

System.

Figure 4:
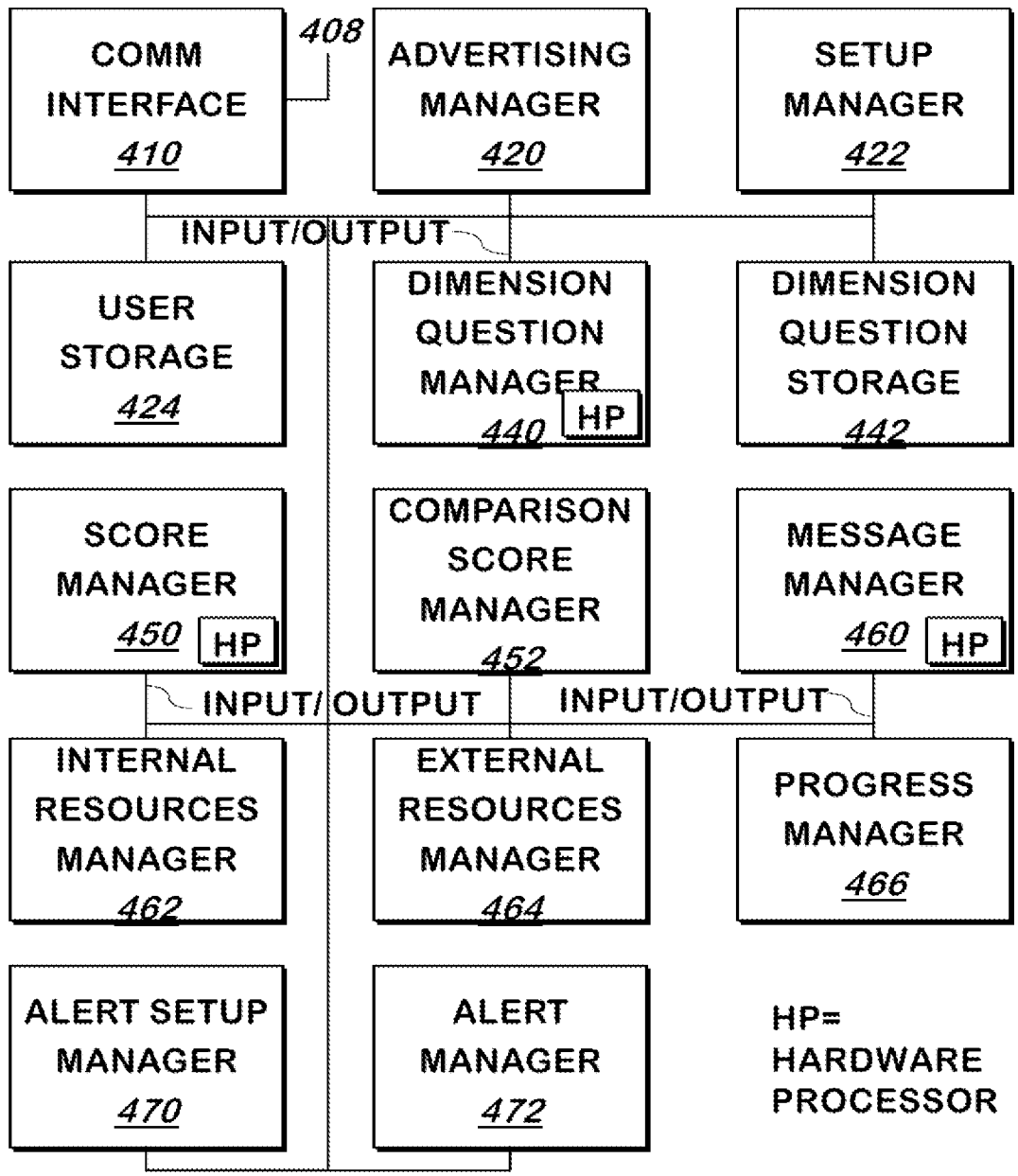
FIG. 4 is a block schematic diagram of a system for assisting an individual with evaluating the suitability of his or her financial and other-than-financial planning and in carrying out a plan according to one embodiment of the present invention.

Referring now to FIG. 4, a system for assisting a user in evaluating the adequacy of their financial planning and other-than-financial planning and for assisting the user in improving their financial and other-than-financial planning is shown according to one embodiment of the present invention.

Communication interface 410 includes a conventional communication interface, such as a conventional Ethernet interface running suitable communications protocols, such as Ethernet, TCP/IP or both, and is coupled to a local area network, such as an Ethernet network, a wide area network such as the Internet, or both, via input/output 408. In one embodiment, all communication into or out of the system of FIG. 4 is made via input/output 408 of communication interface 410.

Advertising manager 420 provides advertisements for the use of the system of FIG. 4, as described above, and receives requests from a user, for example, via clicks of such advertisements, indicating a desire to operate such system. When advertising manager 420 receives such a request, advertising manager 420 signals setup manager 422.

When signaled, setup manager 422 provides a user interface to request demographic information from the user and receives such information as described above. Setup manager 422 stores the demographic information into user storage 424, associated with a temporary user identifier associated with the user's IP address. In one embodiment, user storage 424 includes conventional memory and/or disk storage, and may include a conventional database. In one embodiment, setup manager 422 also requests an optional user identifier from the user or from an authentication system (not shown) with which the user may have already authenticated himself. If such user identifier is received, setup manager 422 also associates the user identifier with such demographic information in user storage 424. Other information may also be requested and received from the user, and stored into user storage 424 associated with a user identifier such as the user identifier or IP address or both by setup manager 422. When setup manager 422 has completed the process of requesting such information from the user, setup manager 422 signals dimension question manager 440 with a reference to the information it stored.

When signaled, dimension question manager 440 provides the dimension questions that have been stored by a system administrator in dimension question storage 442 containing memory or disk storage, and receives the responses as described above. Dimension question manager 440 stores each of the dimension question responses associated with the dimension or specific question into user storage 424 associated with one of the above identifiers of the user. When it completes the questioning process, dimension question manager 440 signals score manager 450 with a reference to the user's information in user information storage 424.

Score manager 450 uses the responses in user storage 424 and an answer key stored by a system administrator in dimension question storage 442, provides the dimension and/or overall scores for display to the user as described above and stores them into user storage 424 associated with one of the identifiers of the user. As noted above, the overall score is produced using the responses from at least two different dimensions. In one embodiment, the overall score is not only provided using responses from two different dimensions, but the overall score is produced using the responses of financial dimensions as well as other-than-financial dimensions. Score manager 450 signals comparison score manager 452 with a reference to the user's information in user information storage 424, which provides the comparison scores for display to the user as described above.

In one embodiment, score manager 450 provides a user interface to the user to allow the user to be shown or not be shown the comparison scores, and optionally to select the source of the scores, such as other users optionally of the same or similar demographic as the user, or prior responses of the same user identifier if one had been provided as described above and was provided at the time the prior scores were identified. In such embodiment, score manager 450 signals comparison score manager 452 only if the user indicates they wish to view the one or more comparison scores and optionally provides to comparison score manager 452 an indicator of the source of such comparison scores selected by the user and comparison score manager 452 uses such selected source as the source of the comparison score or scores. In one embodiment, score manager 450 selects between the source of the comparison scores described above based on whether any prior scores are stored in user storage 424 for the same user, using such scores if available, and average scores of other individuals as described above if no such scores are available, or using both sets of other scores separately or combined, if available.

Score manager 450 also signals message manager 460 with a reference to the user's information in user information storage 424. When signaled, message manager 460 selects and provides the messages to the user as described above, including high, medium or low messages (or selecting from among other numbers of messages for each dimension) and suggested action messages as described above. The messages may be provided using different colors as described above. The thresholds used are received by message manager 460 based on responses from either the user or other users or other users of similar demographics as the user. For each dimension for which a message is provided, message manager 460 signals internal resources manager 462 with the dimension and a reference to the user's information in user information storage 424, and internal resources manager 462 identifies and provides for display to the user information regarding internal resources for that dimension as described above. For each dimension for which a message is provided, message manager 460 also signals external resources manager 464 with the dimension and a reference to the user's information in user information storage 424, and external resources manager 464 identifies and provides for display to the user information regarding external resources for that dimension as described above.

As part of the messages message manager 460 encodes in a link to progress manager 466 the reference to the user's information in user storage 424. When the link is clicked, progress manager 466 shows progress both in scoring (from any prior times the user has used the system of FIG. 4) and action items the user marked off as completed, and builds and provides for display or printing a to do list as described above. Progress manager 466 stores the to do list into user storage 424 associated with the information corresponding to the reference it receives as part of the link. The to do list is generated by progress manager 466 from the user's most recent responses and may also be built using prior to do lists and action items checked off on such "to do" lists.

To identify the progress, progress manager 466 uses other information previously stored in user storage 424 for the same user identifier when that user used the system of FIG. 4 at an earlier time, as described above. If no such other information exists, progress manager 466 will not display any progress, but may display a message that indicates that progress can be tracked on subsequent uses of the system of FIG. 4. When progress manager 466 has completed building and displaying any progress or displaying the message, progress manager 466 provides a link to alert setup manager 470 with a reference to the user's information in user storage 424.

When the link is clicked, alert setup manager 470 uses the user information corresponding to the user it receives to provide a user interface to set up alerts in user storage 424 corresponding to the most recent to do list as described above. If the user indicates that they wish to have alerts set up as described above, alert setup manager 470 stores the alert information, such as the date of the next alert and optionally a frequency of alerts as described above into user storage 424 associated with the user identifier corresponding to the reference it receives.

Alert manager 472 daily or weekly identifies in user storage 424 the alerts due or past due to be sent and sends them as described above. Alert manager 472 may include in some or all of the alerts a link that, if clicked, causes alert manager 472 to receive a request for a user interface that has embedded information that allows alert manager 472 to determine an identifier of the user, the association between the embedded information and the user identifier having been stored by alert manager 472 with the user information in user storage 424 when it sent the alert. In response to such a request, when the user clicks the link, alert manager 472 provides a user interface that displays uncompleted action items from the user's most recent to do list and allows the user to indicate action items completed as described above. Alert manager 472 stores in user storage 424 the indicated completed action items for use as described herein.

In this manner, the alerts, messages, scores, comparison scores, and to do lists are made not only from responses to questions of financial dimensions, but also to responses to questions of other-than-financial dimensions. The whole becomes greater than the sum of the parts, in that not only are both types of dimensions addressed, but the user is more likely to feel that the planning process is more thorough and therefore will be more likely to participate in the process described herein, but will also be more likely to keep up with the "to do" list, knowing that it does not merely address a single dimension or a single type of dimension: financial, or other-than-financial, but in fact is a thorough list of responsible planning.

APPENDIX A: QUESTIONS, POTENTIAL RESPONSES AND RESPONSE SCORES (Scores of responses (0, 1, 2 or 3) are shown in [square brackets] next to the corresponding response)
1. You can answer some of the following questions as part of a household or as an individual.
   If you combine your finances with others, then answering as a household may make sense for you.
   If you don't combine your finances with anyone then answering as an individual may make sense for you
Please select which perspective you will use to answer the following questions.
   (Please select one response.)
   ○ Individual
   ○ Household Basic Financial Information The first questions are about your background and financial situation.
   2. In what year were you born?
(Please select one response.)
   [INSERT DROP DOWN LIST OF YEARS: 1908-1990]
   ○ Prefer not to answer
   3. What is your annual income before taxes, including all sources such as earnings, social security, rents and royalties, child support, alimony, investment income, pension/retirement income, etc.?
(Please enter dollar amount.)
Your answer will be used to calculate some subsequent questions.
$_____.00

4. Which of the following best describes your current employment status?
(Please select one response.)
   ○ Working full-time
   ○ Working part-time
   ○ Retired
   ○ Student
   ○ Homemaker
   ○ Not currently employed
   ○ Other
   5. Which one of the following best describes your level of knowledge of financial matters?
(Please select one response.)
   ○ Extensive
   ○ Good
   ○ Limited
   ○ None Lifetime Budgeting The next questions are about budgeting.
   6. When was the last time you created an annual budget?
(Please select one response.)
   ○ During the past year [3]
   ○ 1-2 years ago [2]
   ○ More than 2 years ago [1]
   ○ Never [0]
   ○ Don't know [0]
   7. What are some of the things in your annual budget that you are saving for?
(Please select all that apply.)
   ☐ Retirement
   ☐ New Home
   ☐ College Education
   ☐ Travel/Leisure
   ☐ Emergency Fund
   ☐ Other
   ☐ Nothing
   ☐ Don't know
When was the last time you calculated the amount of money you need for each item that you are saving for?
(Please select all that apply.)

|  | During the Past Year | 1-2 Years Ago | More than 2 Years Ago | Never |
|---|---|---|---|---|
| a. Retirement | ☐ | ☐ | ☐ | ☐ |
| b. New Home | ☐ | ☐ | ☐ | ☐ |
| c. College Education | ☐ | ☐ | ☐ | ☐ |
| d. Travel/Leisure | ☐ | ☐ | ☐ | ☐ |
| e. Emergency Fund | ☐ | ☐ | ☐ | ☐ |
| f. Other | ☐ | ☐ | ☐ | ☐ |
| POINTS ARE MUTALLY EXCLUSIVE. CONFIRM IF GET POINTS FOR EACH OR IF ANY | [3 IF ANY] | [2 POINTS IF ANY] | [1 POINT IF ANY] | [0 POINT IF ANY] |

9. How much do you save each month, including your contributions to your retirement accounts?
The dollar amounts have been calculated for you based on the income you entered previously.

(Please select one response.)
- ○ Approximately $_____ [INCOME FROM Q3*0.10]—about 10% or more of your monthly income.
- ○ Approximately $_____ [INCOME FROM Q3*0.08] to $_____ [INCOME FROM Q3*0.10]—8-10% of your monthly income.
- ○ Approximately $_____ [INCOME FROM Q3*0.06] to $_____ [INCOME FROM Q3*0.08]—6-8% of your monthly income.
- ○ Approximately $_____ [INCOME FROM Q3*0.04]—about 6% or less of your monthly income.

10. How many months of living expenses do you think you could cover with readily accessible savings?

(Please select one response.)
- ○ More than 3 months [3]
- ○ About 2-3 months [2]
- ○ About 1-2 months [1]
- ○ Less than 1 month [0]
- ○ Don't know [0]

11. When was the last time you calculated your personal net worth (i.e., what you own minus what you owe)?

(Please select one response.)
- ○ During the past year [3]
- ○ 1-2 years ago [2]
- ○ More than 2 years ago [1]
- ○ Never [0]
- ○ Don't know [0]

12. How certain are you that your current and expected income, investments, and savings will be enough to cover your expenses for the remainder of your life?

(Please select one response.)
- ○ Absolutely certain [3]
- ○ Somewhat certain [1]
- ○ Not at all certain [0]

Investing

The next questions are about investing.

13. Which of the following types of investments do you have, if any?

(Please select all that apply.)
- ☐ Mutual funds
- ☐ Stocks
- ☐ Bonds
- ☐ Real estate, excluding your primary residence
- ☐ Other
- ☐ None
- ☐ Don't know IF the user selected "None" OR "Don't know" for Q13, skip to Q18.
IF the user selected mutual funds, stocks, bonds, real estate, OR other FOR Q13, Q14-Q17 are used.
For the next few questions, consider all of your investments, including long-term and short-term investments.

14. When was the last time you checked to see that your investments are diversified?

Diversification means having your assets in different categories of investments such as stocks and bonds, and across different industries.

(Please select one response.)
- ○ During the past year [3]
- ○ 1-2 years ago [2]
- ○ More than 2 years ago [1]
- ○ Never [0]
- ○ Don't know [0]

15. How many of your investments are based on your current financial goals and risk tolerance?

(Please select one response.)
- ○ All [3]
- ○ Some [1]
- ○ None [0]
- ○ Don't know [0]

16. When was the last time you compared the performance of your investments to the performance of similar investments? For example, compared your large company stocks to the S&P 500 Index.

(Please select one response.)
- ○ During the past year [3]
- ○ 1-2 years ago [2]
- ○ More than 2 years ago [1]
- ○ Never [0]
- ○ Don't know [0]

17. When was the last time you reviewed or made changes to your investments?

(Please select one response.)
- ○ During the past year [3]
- ○ 1-2 years ago [2]
- ○ More than 2 years ago [1]
- ○ Never [0]
- ○ Don't know [0]

Borrowing

The next questions are about borrowing.

18. Do you have outstanding debt such as a mortgage, car loans, student loans, or credit card balances?

(Please select one response.)
- ○ Yes
- ○ No

IF the user selected "No" FOR Q18, skip to Q23.
IF the user selected "Yes," Q19-Q22 are used.

19. Do you understand all the rates, terms and tax implications of your outstanding debt?

(Please select one response.)
- ○ Completely understand [3]
- ○ Generally understand [2]
- ○ Do not understand [0]

20. How much do you pay each month for home-related debt for your primary residence, including mortgage payment, taxes, insurance, home owners' association dues, and/or home equity lines of credit?

The dollar amounts have been calculated for you based on the income you entered previously.

(Please select one response.)
- ○ I rent. Not applicable. [3]
- ○ Approximately $_____ [INCOME FROM Q3*0.20]—about 20% or less of your monthly income. [3]
- ○ Approximately $_____ [INCOME FROM Q3*0.20] to $_____ [INCOME FROM Q3*0.30]—20-30% of your monthly income. [1]
- ○ Approximately $_____ [INCOME FROM Q3*0.30]—about 30% or more of your monthly income. [0]

21. How much do you pay each month for other types of debt, for example, car loans, student loans, and real estate investment properties. Please do not include your primary residence, and interest and finance charges from credit card balances.

The dollar amounts have been calculated for you based on the income you entered previously.

(Please select one response.)
○ Approximately $_____ [INCOME FROM Q3*0.10]—about 10% or less of your monthly income. [3]
○ Approximately $_____ [INCOME FROM Q3*0.10] to $_____ [INCOME FROM Q3*0.15]—10-15% of your monthly income. [1]
○ Approximately $_____ [INCOME FROM Q3*0.15]—about 15% or more of your monthly income. [0]
22. Do you pay the full balance on your credit card(s) every month?
(Please select one response.)
○ Yes [3]
○ No [0]
○ I don't have any credit cards [3]

Insuring

The next questions are about insurance.
23. Do you feel like you have the right level of coverage for the following types of insurance?
(Please select one response per row.)

|  | Yes | No | Don't Know |
|---|---|---|---|
| a. Life | ○ | ○ | ○ |
| b. Disability | ○ | ○ | ○ |
| c. Health | ○ | ○ | ○ |
| d. Property and Casualty-Insurance on homes, cars and businesses. | ○ | ○ | ○ |
| e. Liability-Insurance for those at risk for being sued by a third party for negligence, e.g., small business owners. This is separate from the liability insurance included in property and casualty coverage. | ○ | ○ | ○ |
|  | [3 POINTS FOR EACH YES] | [0 POINTS FOR EACH NO] | [0 POINTS FOR EACH DON'T KNOW] |

Estate Planning

The following questions are about estate planning.
24. Is your will up-to-date?
(Please select one response.)
○ Yes [3]
○ No [0]
○ Don't know [0]
○ I don't have a will. [0]
25. Is your choice up-to-date for the person who will handle your legal affairs if you are unable to do so yourself?
(Please select one response.)
○ Yes [3]
○ No [0]
○ Don't know [0]
○ I haven't named a person to handle my legal affairs. [0]
26. Is your choice up-to-date for the person who will make health care decisions on your behalf if you are unable to do so yourself?
(Please select one response.)
○ Yes [3]
○ No [0]
○ Don't know [0]
○ I haven't named a person to make health care decisions on by behalf. [0]
27. Are your choices up-to-date for the beneficiaries of your financial accounts?
(Please select one response.)
○ Yes [3]
○ No [0]
○ Don't know [0]
○ I don't have designated beneficiaries for my financial accounts. [0]

What is claimed is:

1. A computer-based method of configuring a resources server to provide at least one resource, the method comprising:
providing a plurality of questions, each of the plurality of questions corresponding to at least one of a plurality of planning dimensions, the plurality of planning dimensions including at least one financial planning dimension and at least one other than financial planning dimension;
receiving a response to each of the plurality of questions and demographic information from a user;
storing each response to the plurality of questions and the demographic information from the user in a computer memory, the plurality of responses being associated with the demographic information received from the user;
determining, via a hardware processor coupled to the computer memory, at least one planning dimension score for each of the plurality of planning dimensions using the responses received from the user to the plurality of questions;
determining an overall score for the user, the overall score based on the planning dimension scores for each of the plurality of planning dimensions;
obtaining a comparison score, the comparison score being at least one of an overall score for the user from a previous set of responses to each of the plurality of questions or an overall score of a second user with similar demographic information as the user;
providing at least one of the plurality of planning dimension scores to the resources server to select for the user, for at least one of the plurality of planning dimensions, a resource from a plurality of resources;
generating a to do list of actions for the user to complete to improve at least one of the plurality of planning dimension scores or the overall score;
outputting the overall score, the comparison score, the to do list, and the selected resources to the user; and
automatically notifying the user to update the to do list, wherein timing of the automatic notifications is determined and updated based on a total number of uncompleted items on the to do list.

2. The method of claim 1, wherein the plurality of planning dimensions comprise:
lifetime budgeting;
investing;
borrowing;
insuring; and
estate planning.

3. The method of claim 1, wherein each of the plurality of planning dimension scores correspond to at least one, but fewer than all, of the plurality of planning dimensions.

4. The method of claim 1, wherein a resource is selected for one of the plurality of planning dimensions responsive to at least one response to at least one question corresponding to the planning dimension.

5. The method of claim 1,
wherein the to do list is generated responsive to the response to at least one of the plurality of questions.

6. The method of claim 1, wherein automatically notifying the user to update the to do list includes automatically sending an email message to the user.

7. A system for analyzing an individual's suitability of financial and other-than-financial planning status, the system comprising:
at least one processor; and
a memory coupled to the at least one processor, the memory configured to store instructions that when executed by the processor cause the system to perform,
providing at an output, to a user, a plurality of questions, each of the plurality of questions corresponding to at least one of a plurality of planning dimensions, the plurality of planning dimensions including at least one financial planning dimension and at least one other than financial planning dimension,
receiving, via an input, a response to each of the plurality of questions and demographic information from the user,
storing each response to the plurality of questions and the demographic information from the user in the memory, the plurality of responses being associated with the demographic information received from the user,
determining, at least one planning dimension score for each of the plurality of planning dimensions using the responses received from the user to the plurality of questions,
determining an overall score for the user, the overall score based on the planning dimension scores for each of the plurality of planning dimensions,
obtaining a comparison score, the comparison score being at least one of an overall score for the user from a previous set of responses to each of the plurality of questions or an overall score of a second user with similar demographic information as the user,
providing, to a resources server, the computed at least one planning dimension score,
selecting, with the resources server, a resource from a plurality of resources for each of at least one of the plurality of planning dimensions,
generating a to do list of actions for the user to complete to improve at least one of the plurality of planning dimension scores or the overall score,
outputting at least one of the plurality of planning dimension scores, the overall score, the comparison score, the to do list, and the selected resources to the user, and
automatically notifying the user to update the to do list, wherein timing of the automatic notifications is determined and updated based on a total number of uncompleted items on the to do list.

8. The system of claim 7, wherein the plurality of planning dimensions comprise:
lifetime budgeting;
investing;
borrowing;
insuring; and
estate planning.

9. The system of claim 7, wherein each of the plurality of planning dimension scores correspond to at least one, but fewer than all, of the plurality of planning dimensions.

10. The system of claim 7, wherein a resource is selected for one of the plurality of planning dimensions responsive to at least one response to at least one question corresponding to the planning dimension.

11. The system of claim 7,
wherein the to do list is generated responsive to the response to at least some of the plurality of questions.

12. A non-transitory computer useable medium having computer readable program code devices embodied therein for configuring a resources server to:
provide a plurality of questions, each of the plurality of questions corresponding to at least one of a plurality of planning dimensions, the plurality of planning dimensions including at least one financial planning dimension and at least one other than financial planning dimension;
receive a response to each of the plurality of questions and demographic information from a user;
store each response to the plurality of questions and the demographic information from the user in a computer memory, the plurality of responses being associated with the demographic information received from the user;
determine, via a hardware processor coupled to the computer memory, at least one planning dimension score for each of the plurality of planning dimensions using responses received from the user for the plurality of questions;
determine an overall score for the user, the overall score based on the planning dimension scores for each of the plurality of planning dimensions;
obtain a comparison score, the comparison score being at least one of an overall score for the user from a previous set of responses to each of the plurality of questions or an overall score of a second user with similar demographic information as the user;
provide at least one of the plurality of planning dimension scores to the resources server to select for the user, for at least one of the plurality of planning dimensions, a resource from a plurality of resources;
generate a to do list of actions for the user to complete to improve at least one of the plurality of planning dimension scores or the overall score;
output the overall score, the comparison score, the to do list, and the selected resources to the user, and
automatically notify the user to update the to do list, wherein timing of the automatic notifications is determined and updated based on a total number of uncompleted items on the to do list.

13. The non-transitory computer useable medium of claim 12, wherein the plurality of planning dimensions comprise:
lifetime budgeting;
investing;
borrowing;
insuring; and
estate planning.

14. The non-transitory computer useable medium of claim 12, wherein each of the plurality of planning dimension scores correspond to at least one, but fewer than all, of the plurality of planning dimensions.

15. The non-transitory computer useable medium of claim 12, wherein a resource is selected for one of the plurality of planning dimensions responsive to at least one response to at least one question corresponding to the planning dimension.

16. The non-transitory computer useable medium of claim 12,
wherein the to do list is generated responsive to the response to at least one of the plurality of questions.

* * * * *